United States Patent
Sanders et al.

(10) Patent No.: US 9,152,794 B1
(45) Date of Patent: Oct. 6, 2015

(54) SECURE KEY HANDLING FOR AUTHENTICATION OF SOFTWARE FOR A SYSTEM-ON-CHIP

(71) Applicant: Xilinx, Inc., San Jose, CA (US)

(72) Inventors: Lester S. Sanders, Albuquerque, NM (US); Yatharth K. Kochar, Hyderabad (IN)

(73) Assignee: XILINX, INC., San Jose, CA (US)

( * ) Notice: Subject to any disclaimer, the term of this patent is extended or adjusted under 35 U.S.C. 154(b) by 142 days.

(21) Appl. No.: 14/019,323

(22) Filed: Sep. 5, 2013

(51) Int. Cl.
*G06F 21/57* (2013.01)
*H04L 9/32* (2006.01)

(52) U.S. Cl.
CPC ............ *G06F 21/575* (2013.01); *H04L 9/3247* (2013.01)

(58) Field of Classification Search
CPC ............. H04L 9/3281; H04N 21/8358; H04N 1/32144; H04N 2201/3233; G11B 20/00086
USPC ...................................................... 713/176, 2
See application file for complete search history.

(56) References Cited

U.S. PATENT DOCUMENTS

| | | |
|---|---|---|
| 2005/0125396 A1 | 6/2005 | Liu |
| 2006/0026429 A1* | 2/2006 | Kudo et al. ................... 713/173 |
| 2007/0038685 A1 | 2/2007 | Chan et al. |
| 2008/0141017 A1 | 6/2008 | McCoull et al. |
| 2008/0256366 A1 | 10/2008 | Dale et al. |
| 2009/0089570 A1 | 4/2009 | Andrianov |
| 2009/0204803 A1 | 8/2009 | Cox et al. |
| 2009/0327680 A1 | 12/2009 | Dale et al. |
| 2010/0070749 A1 | 3/2010 | Tsai |
| 2010/0241837 A1 | 9/2010 | Concorso |
| 2011/0265183 A1 | 10/2011 | Wu et al. |
| 2012/0210115 A1* | 8/2012 | Park et al. ...................... 713/2 |
| 2013/0042098 A1 | 2/2013 | Baik et al. |
| 2013/0185563 A1 | 7/2013 | Djabarov et al. |

OTHER PUBLICATIONS

U.S. Appl. No. 13/833,177, filed Mar. 15, 2013, Sanders et al.
U.S. Appl. No. 13/775,151, filed Feb. 23, 2013, Peterson et al.
U.S. Appl. No. 13/833,371, filed Mar. 15, 2013, Kochar.
Xilinx, Inc., *Zynq-7000 All Programmable SoC Software Developers Guide*, UG821 (v3.0), Oct. 16, 2012, pp. 1-42, Xilinx, Inc., San Jose, California, USA.

(Continued)

*Primary Examiner* — Baotran N To
(74) *Attorney, Agent, or Firm* — W. Eric Webostad; LeRoy D. Maunu (57) ABSTRACT

A method relating generally to generating a boot image, as performed by an information handling system, for an embedded device is disclosed. This method includes a public key obtained by a boot image generator. A first hash for the public key is generated by the boot image generator. The first hash is provided to a signature generator. A first signature for the first hash is generated by the signature generator. A first partition for the boot image is obtained by the boot image generator. A second hash for the first partition is generated by the boot image generator. The second hash is provided to the signature generator. A second signature for the second hash is generated by the signature generator. The boot image generator and the signature generator are programmed into the information handling system. The boot image includes the public key, the first signature, and the second signature. The boot image is output from the information handling system.

20 Claims, 6 Drawing Sheets

(56) References Cited

OTHER PUBLICATIONS

Xilinx, Inc., *Zynq-7000 All Programmable SoC Technical Reference Manual,* UG585 (v1.4), Nov. 16, 2012, Chapters 6, 27, 28, 32 (76 pages), Xilinx, Inc., San Jose, California, USA.

Huang, Andrew, "Keeping Secrets in Hardware: the Microsoft Xbox Case Study," AI Memo 2002-008, May 26, 2001, pp. 1-15, Massachusetts Institute of Technology, Artificial Intelligence Lab, Cambridge, Massachusetts, USA.

Elinux.Org, "RPi U-Boot," *Embedded Linux Wiki,* Dec. 2, 2012, web Feb. 18, 2014, <http://elinux.org/index.php?title=RPi_U-boot&oldid=197048&print>.

* cited by examiner

SECURE KEY HANDLING FOR AUTHENTICATION OF SOFTWARE FOR A SYSTEM-ON-CHIP

TECHNICAL FIELD

The following description relates to integrated circuit devices ("ICs"). More particularly, the following description relates to secure key handling for authentication of software for a system-on-chip ("SoC").

BACKGROUND

Embedded devices are used in many systems, such as phones, tablets, and a variety of other electronic equipment. Embedded devices may include ICs, which may include field programmable gate arrays ("FPGAs"), SoCs, and SoC-FPGAs, for example. Image generator software, which conventionally runs on a general-purpose computer, such as a personal computer ("PC") for example, may generate an image which is loaded into and runs on a fielded embedded device. Such an image may be loaded by such fielded embedded device, either with a "boot loader," as is conventionally done with SoCs or SoC-FPGAs, or configuration circuitry, as is conventionally done with an FPGA. A boot loader may be used to load software for execution in an SoC for example.

Public-private key pair cryptography, such as RSA for example, may be used to authenticate software. Authentication may be used to verify that an adversary has not altered such software. In an authentication process, software may be signed with a private key. However, a threat to the security of a device is that an adversary may obtain such a private key.

Accordingly, it would be desirable to provide for more secure key handling which reduces exposure of a private key.

SUMMARY

An apparatus relates generally to generation of an image file. In such an apparatus, an image generator is coupled to receive partitions and a public key and configured to generate respective hashes of the partitions and a hash of the public key. A signature generator in communication with the image generator is to generate respective signatures for the hashes in association with the public key and a signature of the hash of the public key. The image generator and the signature generator are programmed into a general-purpose computer to provide a special-purpose computer. The special-purpose computer is configured to output the image file for an embedded device. The image file includes the public key, the signatures of the hashes of the partitions, and the signature of the hash of the public key.

A method relates generally to generating a boot image, as performed by an information handling system, for an embedded device. In such a method, a public key is obtained by a boot image generator. A first hash for the public key is generated by the boot image generator. The first hash is provided to a signature generator. A first signature for the first hash is generated by the signature generator. A first partition for the boot image is obtained by the boot image generator. A second hash for the first partition is generated by the boot image generator. The second hash is provided to the signature generator. A second signature for the second hash is generated by the signature generator. The boot image generator and the signature generator are programmed into the information handling system. The boot image includes the public key, the first signature, and the second signature. The boot image is output from the information handling system.

Another method performed by an information handling system generally relates to generation of a boot image for an embedded device. In such method, a key hash is generated by an image writer for each of a plurality of public key sets to provide a plurality of key hashes. A key signature is generated by a signature tool for each of the plurality of key hashes to provide a plurality of key signatures. A partition hash is generated by the image writer for each of a plurality of partitions to provide a plurality of partition hashes. A partition signature is generated by the signature tool for each of the plurality of partition hashes to provide a plurality of partition signatures. The information handling system is programmed with the image writer and the signature tool. The boot image is output from the information handling system. The boot image includes the plurality of partition signatures.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

Exposure of private or secret keys of a private-public key pair is a threat to security. Having such private keys in a boot image file used to authenticate a partition thus may be a threat to security. With the above general understanding borne in mind, various configurations for generating a boot image with a public key, so as not to expose a private key, for authenticating a partition are generally described below.

Along the above lines, a method of secure key handling which limits exposure of a private key is described below. Such method may be used in conjunction with expensive cryptographic equipment to which access is intentionally limited. This expensive cryptographic equipment, hereafter referred to as a Hardware Security Module ("HSM"), generates public/private key pairs, hashes, and signatures used in a code signing process. A principle in security is to limit access to the HSM and key generation/signing process. Limited access reduces vulnerability to an insider attack.

Such a method to handle a public/private key pair may be used in authenticating software loaded into an embedded device in a more secure manner. To do this, image generation software, which conventionally accepts private keys, instead accepts public keys and signatures. This has an advantage of limiting the exposure of private keys, which if disclosed, is a serious security threat. Additionally, a simulation environment for secure key handling using the above-mentioned method is described.

Because one or more of the above-described examples are described herein using a particular type of IC, a detailed description of such an IC, namely an FPGA, is provided below. However, other types of ICs may benefit from one or more of the techniques described herein. Along those lines, SoC-FPGAs and/or SoCs may be used too.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
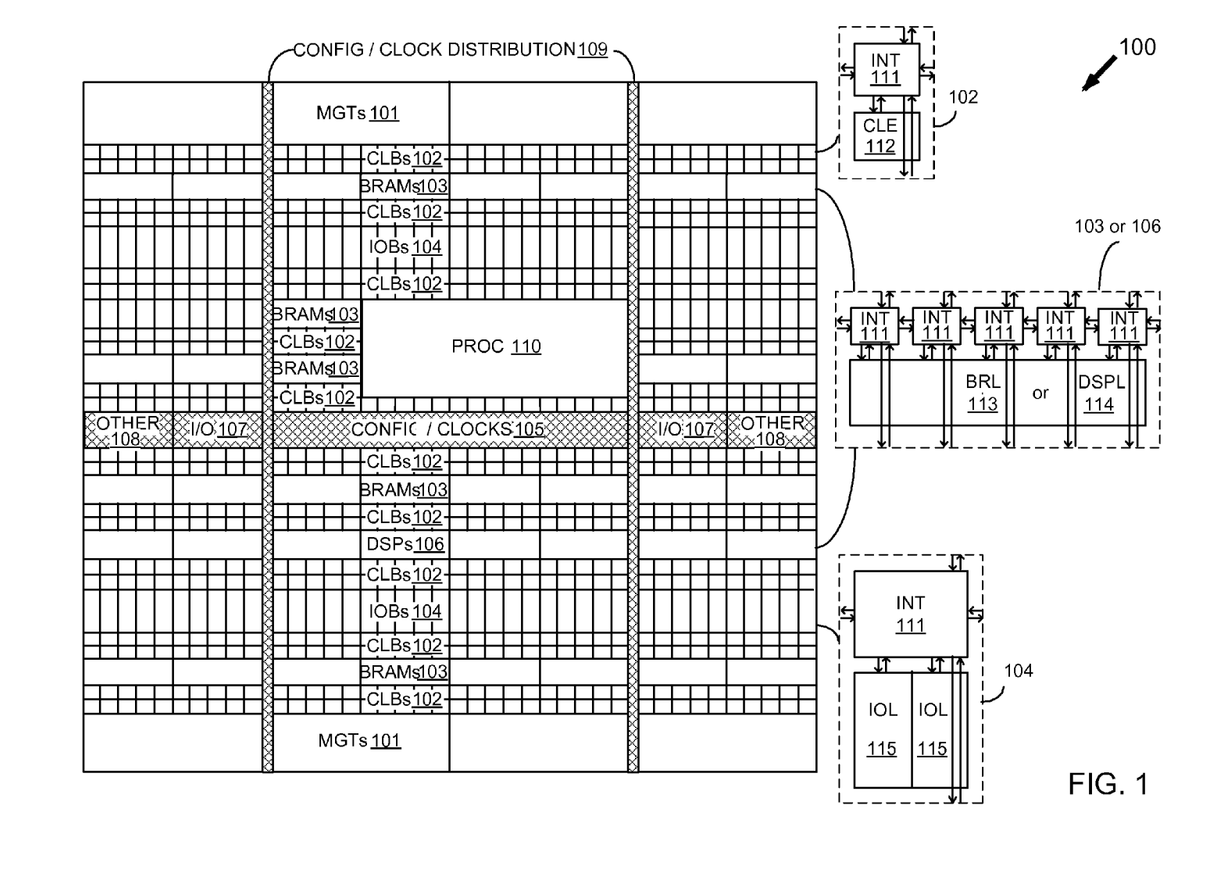
FIG. 1 is a simplified block diagram depicting an exemplary columnar Field Programmable Gate Array ("FPGA") architecture.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
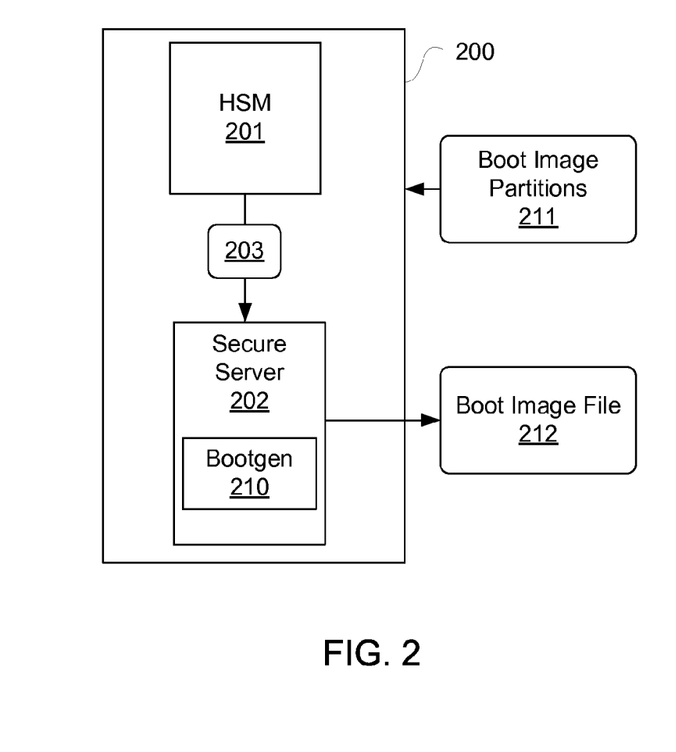
FIG. 2 is a block diagram depicting an exemplary information security system.

FIG. 2 is a block diagram depicting an exemplary information security system 200. System 200 includes a hardware security module ("HSM") 201 and a secure server 202. An HSM is a secure/signature generation device used to generate private keys and provide a public portion of an RSA key pair to an image writer or boot image generator ("Bootgen") 210 running on secure server 202. Only a very limited number of people ("Infosec staff") have access to system 200, and such Infosec staff is responsible for keys, as well as a production release of a secure embedded product, such as boot image file 212. Boot image partitions 211 may be provided to Infosec staff for generation of boot image file 212. Infosec staff need not have any knowledge of a design associated with boot image partitions 211; rather, Infosec staff may simply process such boot image partitions 211 with a release mode version of Bootgen 210 to provide boot image file 212.

Accordingly, because boot image file 212 includes a public portion of an RSA key pair and does not include a private portion of a key pair, security is enhanced as such private portion does not leave the secure environment of system 200 in the form of boot image file 212. Even though the following description is in terms of RSA, other types of private-public key pairs and signatures may be used. As private keys do not leave HSM 201, public keys and associated signatures 203 may effectively be provided from HSM 201 to secure server 202. Boot image file or Bootgen image file ("BIF") 212 for a release mode version of Bootgen 210 includes public, not private, RSA keys, and signatures generated by HSM 201. Public keys associated with private keys may include a primary public key ("ppk") and a secondary public key ("spk").

A developer of boot image partitions 211 may want to emulate system 200 without having to go to Infosec staff to do so. In other words, a developer may want to test out secure key handling without using actual private keys.

Figure 3:
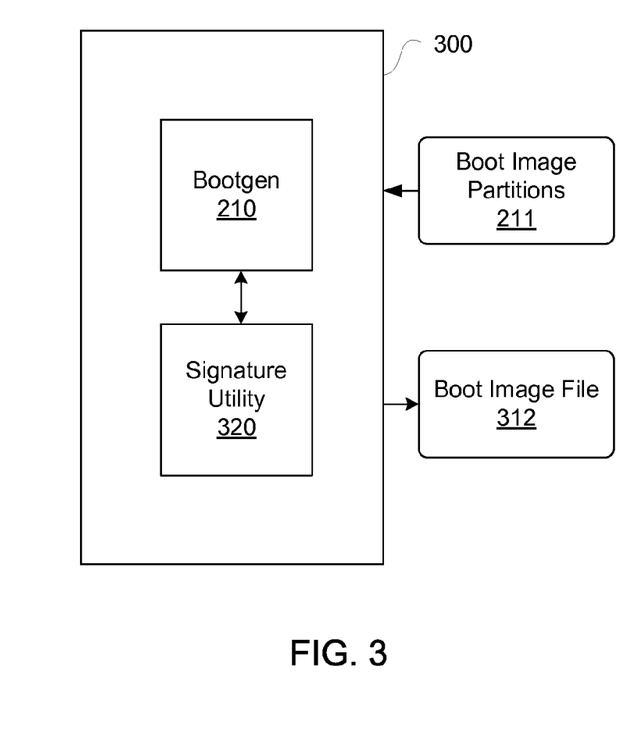
FIG. 3 is a block diagram depicting an exemplary developer system.

FIG. 3 is a block diagram depicting an exemplary developer system 300. Developer system 300 may include one or more general-purpose computers 300, including without limitation a network of computers, having programmed therein an image writer or boot image generator program, such as Bootgen 210, and a signature tool program ("signature tool") 320 for communication with one another. Thus, such system 300 may be a special-purpose computer or computer system having one or more special-purpose computers 300.

System 300 may be for a test mode. Along those lines, boot image partitions 311 may be provided as an input to system 300 to generate a BIF 312 for operation in a test mode of Bootgen 210.

Figure 4A:
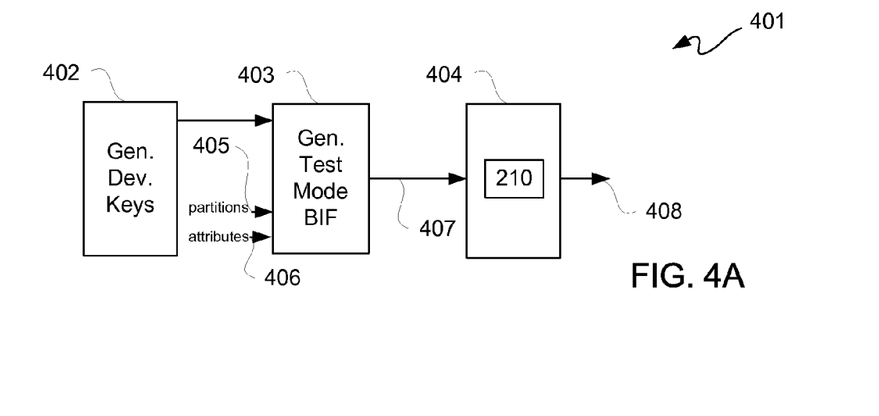
FIGS. 4A through 4C are respective block diagrams of respective operational modes of image writers or boot image generators.
Figure 4B:
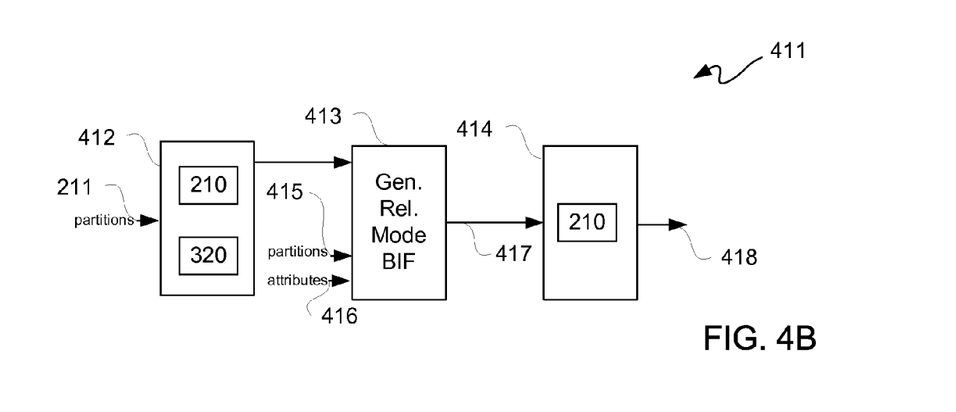
Figure 4C:
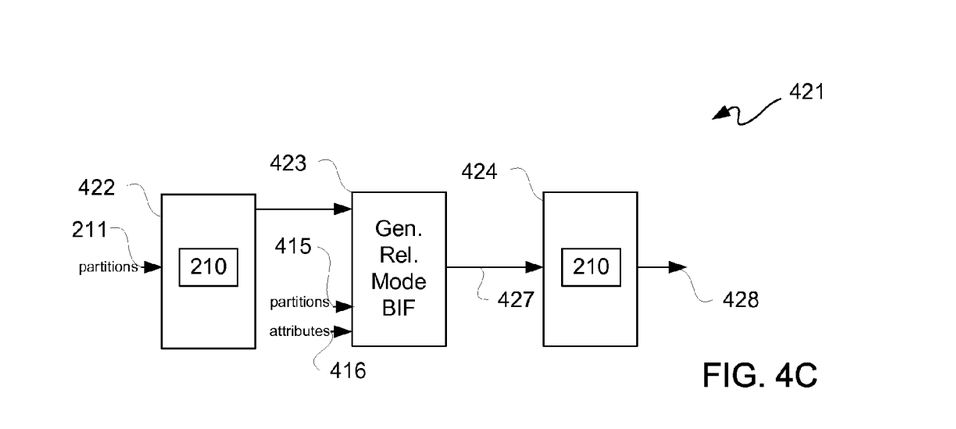

FIGS. 4A through 4C are respective block diagrams of respective operational modes of image writers or boot image generators. Operations mode 401 of FIG. 4A is for a test mode flow. At 402, development keys are generated. Thus, private keys and public keys may be generated at 402. OpenSSL or some other program for private-public key pair generation may be used.

At 403, a test mode BIF 407 may be created. Along those lines, partitions 405 and attributes 406 for such test mode BIF 407 may be manually input in order to manually construct a test mode BIF 407. At 404, such test mode BIF 407 may be input to a Bootgen 210 of FIG. 3 in a test mode. Using such a test mode BIF 407, Bootgen 210 may output a system configuration file 408. Such system configuration file 408 may be in either a binary ("bin") or MCS file format.

With reference to FIG. 4B, an operations mode 411 for a release mode-emulation flow is described. At 412, a Bootgen 210 receives boot image partitions 211 for generating respective hashes thereof. Boot image partitions 211 may be those of test mode BIF 407. Furthermore, at 412, a signature tool 320 may generate signatures for such hashes. Keys associated with such signatures may be public keys of those public-private key pairs generated at 402. At 413, a release mode BIF 417 may be manually created. Along those lines, any additional partitions 415 and attributes 416 for such release mode BIF 417 may be input in order to provide a release mode BIF 417. At 414, such release mode BIF 417 may be input to a Bootgen 210 of FIG. 3 in a release mode. Using such a release mode BIF 417, Bootgen 210 may output a system configuration file 418. Such system configuration file 418 may be in either a binary or MCS file format, and may be the same as system configuration file 408.

With reference to FIG. 4C, an operations mode 421 for a release mode flow is described. Operations mode 411 of FIG. 4B is an emulation of release mode flow of operations mode 421. At 422, an HSM 201 receives boot image partitions 211 for generating respective hashes and signatures for such hashes. Keys associated with such signatures may be actual public keys of actual public-private key pairs with controlled access thereof limited to Infosec staff. At 423, a release mode BIF 427 may be manually generated. Along those lines, any additional partitions 415 and attributes 416 for such release mode BIF 427 may be input in order to provide a release mode BIF 427. At 424, such release mode BIF 427 may be input to a Bootgen 210 of FIG. 3 in a release mode. Using such a release mode BIF 427, Bootgen 210 may output a system configuration file 428. Such system configuration file 428 may be in either a binary or MCS file format, and generally may be the same as system configuration file 418, except system configuration file 428 includes actual public keys and actual signatures in contrast to system configuration file 418 which has test public keys and signatures associated therewith.

Figure 5:
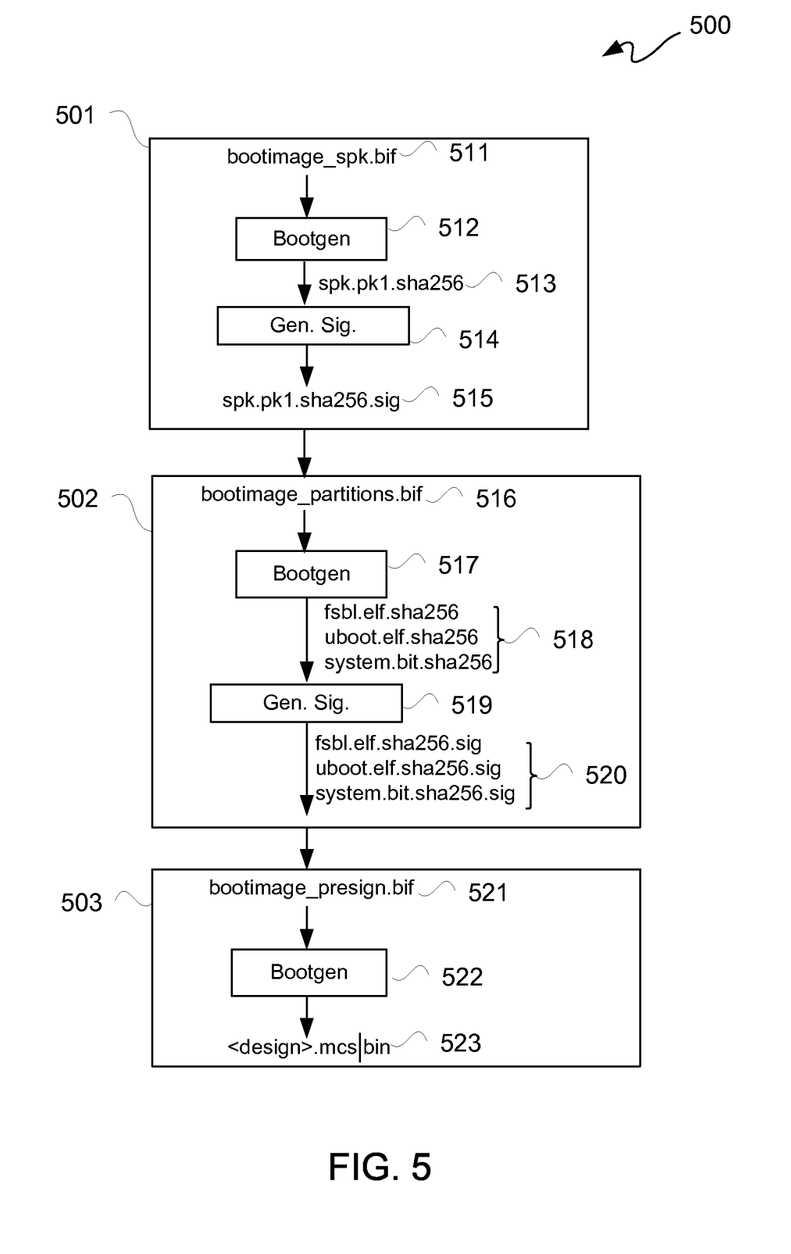
FIG. 5 is a flow diagram depicting an exemplary Bootgen release mode flow.

FIG. 5 is a flow diagram depicting an exemplary Bootgen release mode flow 500. Modules 501 and 502 are emulation function blocks, and module 503 is an output function block for such emulation or for a production release mode.

With reference to module 501, a public key is obtained as provided in association with a boot image. Along those lines, a boot image secondary public key ("SPK" or "spk") BIF 511 may be input to a Bootgen 210 at 512. Bootgen 210 hashes such SPK provided thereto to provide a first public key ("pk1") hash of such SPK. For purposes of clarity by way of example and not limitation, a 256-bit Secure Hash Algorithm ("SHA") is used in this example; however, other types of hash algorithms and/or other bit sizes may be used. Thus, Bootgen 210 in this example may output a key hash 513, namely spk.pk1.sha256. This key hash 513 may be provided to signature tool or signature generator 320 to generate a signature ("gensig") at 514 for such hash. Again, for purposes of clarity by way of example and not limitation, an RSA signature ("sig") is used. Thus, signature tool 320 may output a signature signed key hash 515, namely spk.pk1.sha256.sig 515. Such signed key hash 515 may be provided to module 502.

With reference to module 502, one or more partitions for a boot image may be provided as a boot image partitions BIF 516 for input to Bootgen 210 at 517 of module 502. Bootgen 210 may hash each partition in boot image partitions BIF 516 and may output a partition hash 518 for each partition in such boot image partitions BIF 516. In this example, three partitions are illustratively depicted, namely a first boot loader ("fsbl"), a second boot loader, and a system configuration. More particularly, in this example, the second boot loader is a software boot loader, such as for example a u-boot or u-Boot for loading Linux, and the system configuration is a configuration bitstream ("system.bit") for a programmable logic device in an embedded device or system. Accordingly, a boot image in this example is for a system having a PLD, such as an FPGA for example. However, these or other partitions may be used. A first stage boot loader or hardware boot loader may be closely aligned with Bootgen 210 in that it reads partitions in a boot image created with Bootgen 210. A first stage boot loader copies partitions, generally from non-volatile memory to random access memory. If a system.bit is in a boot image, a first stage boot loader may transfer such a system.bit into programmable logic configuration memory. A first stage boot loader may transfer a second stage boot loader or one or more application partitions to their destination address(es), generally in random access memory. A first stage boot loader can load multiple Executable and Linkable Format ("ELF" or "elf") files. Optionally, a first stage boot loader may load u-boot.elf, and a u-boot, which is a second stage boot loader for loading Linux, may load software partitions.

At this point, an image generator such a Bootgen 210 may allow a user selectable authentication, confidentiality, and integrity on each of partition loaded with use of a public key and not a private key. On a per partition basis, Bootgen 210 allows a user to specify public key RSA code signing without exposing a private key. Such partition signatures allow all partitions in a boot image to be loaded and authenticated in a chain of trust. The chain of trust may ensure that an adversary has not tampered with such a boot image. Additional detail regarding partitions, as well as a system with a PLD that may be booted with such a boot image, may be found in co-pending patent application Ser. No. 13/775,151, filed Feb. 23, 2013, Peterson et al. and Ser. No. 13/833,177, filed Mar. 15, 2013, Sanders et al., assigned to the same assignee hereof, each of which application is hereby incorporated by reference herein in its entirety for all purposes.

In this example, partition hashes 518 include fsb.elf-.sha256, uboot.elf.sha256, and system.bit.sha256; however, these and/or other partitions may be used in other examples. Of these partition hashes, two are in an ELF, and the last of these partitions is in a configuration file format for a PLD, which may vary from PLD-to-PLD. Even though other executable and linkable formats may be used, an ELF, which is not processor specific, may be used for symbol look-ups and for a re-locatable table, namely a table that can be loaded at any memory address by a kernel. Furthermore, for an ELF file, all symbols used may be automatically adjusted to the offset from a memory address where such re-locatable table was loaded to and calculation of where to adjust a symbol's memory references may be performed dynamically at runtime.

At 519, one or more partition hashes 518 may be input to a signature tool 320 to generate one or more corresponding signatures 520, namely one or more signed partition hashes 520. Continuing the above example of three partitions, there are three signed partition hashes 520 in this example, namely fsbl.elf.sha256.sig, uboot.elf.sha256.sig, and system.bit.sha256.sig. Each RSA signature performed at 519 may be with a same secondary public key. Optionally, each RSA signature performed at 519 may be done with a different secondary public key, for example there may be a separate secondary public key for each partition.

With reference to module 503, a boot image BIF with one or more pre-signed partitions may be input, where such pre-signed partitions may be signed partition hashes 520, to Bootgen 210 at 522. In response to such input, Bootgen 210 may output a boot image or design file 523 for instantiation in a system having a PLD. Again, such output may be in a binary or MCS format, the latter of which may generally be thought of as an ASCII format. Such a design file 523 includes signed hashed partitions which may be authenticated for instantiation in such a system. Thus, each partitioned portion of a design may be authenticated prior to allowing such portion to be instantiated in a system. One or more public keys associated with such signed hashed partitions may be used for this authentication.

To recapitulate, an emulation function simulates an HSM-secure server in key/signature generation. This emulation function allows design engineers who do not have access privileges to an HSM to support a release mode build. To emulate an HSM-secure server system, a Bootgen application and an RSA signature tool are iteratively used generate hashes and signatures to sign partitions. When an HSM generates keys and signatures, a Bootgen in a release mode is run once. In a Bootgen release mode emulation, Bootgen is run three times as described in additional detail with reference to FIG. 6.

Figure 6:
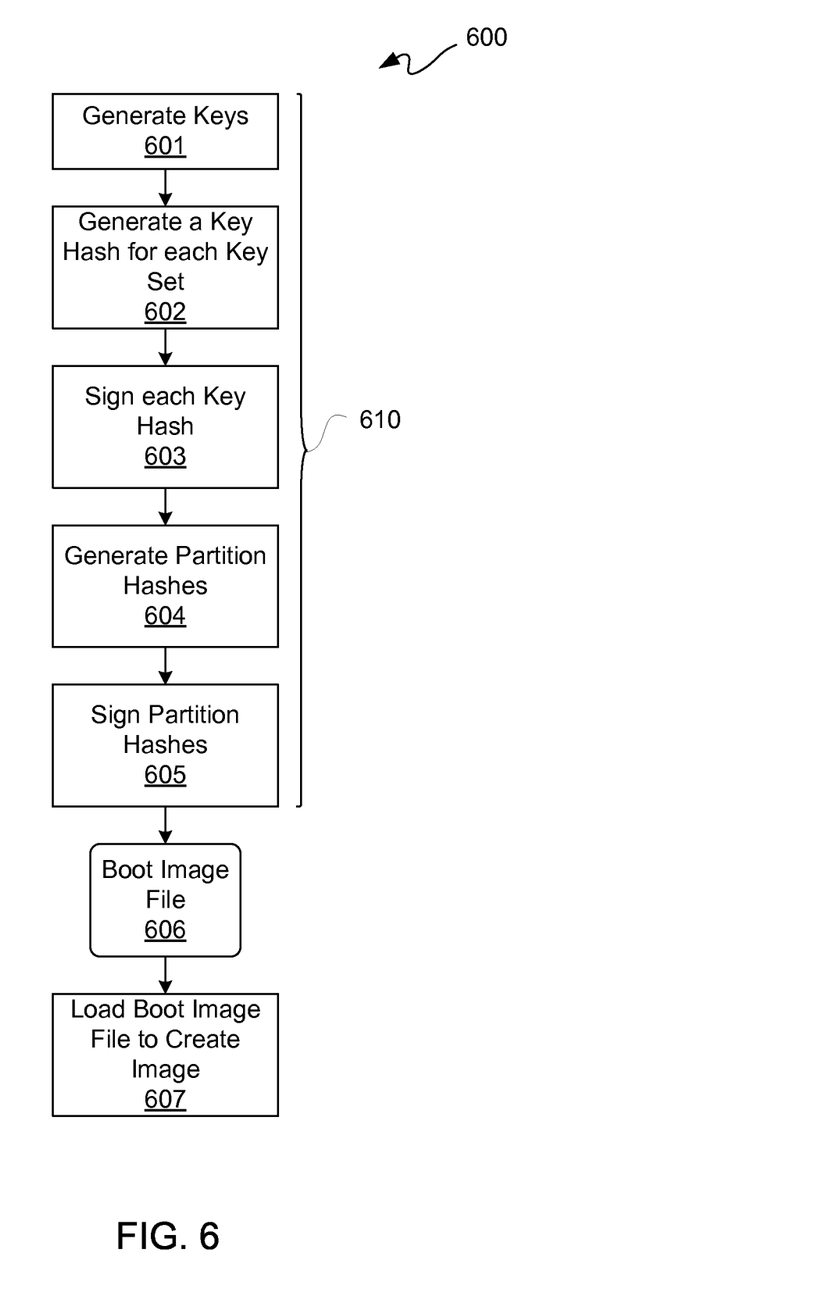
FIG. 6 is a flow diagram depicting an exemplary keys and signatures generation flow for a release mode emulation.

FIG. 6 is a flow diagram depicting an exemplary keys and signatures generation flow 600 for a release mode emulation. At 601, keys are generated. More particularly, at 601 public-private key pairs are generated for RSA. Such key pairs may be generated with OpenSSL or other public-private key pair generator. For purposes of clarity by way of example and not limitation, it shall be assumed that at least first primary and secondary public keys, namely ppk.pk1 and spk.pk1, are generated at 601 from corresponding primary secret key ("psk") and secondary secret key ("ssk").

At 602, a key hash is generated for each public key set by an image writer, such as Bootgen 210. A first public key set may be ppk.pk1 and spk.pk1. However, there may be multiple public key sets generated, namely one for each partition for example. Such key hash may be of a secondary public key of a public key set. Thus, for example, a Bootgen 210 may receive a boot image spk BIF file to generate a hash of such spk, namely to provide for example an spk.pk1.sha256 hash value as previously described.

At 603, to emulate an HSM, each such hash value generated at 602 is signed at 603 by signature tool 320. Thus, for example, signature tool 320 may obtain a primary secret key ("psk") for an associated public key, for example pk1, namely obtain psk.pk1, to sign data, where such data is a hash value. In this example, such hash value is spk.pk1.sha256; however, as previously described other public key sets may be generated, and thus other secondary public keys from such key sets may likewise be signed at 603.

At 604, partition hashes are generated. At 604, a boot image partitions BIF file may be input to Bootgen 210. Partition hashes may be generated from such a boot image partitions file. Such boot image partitions file may have a primary public key, a secondary public key, a signature of the secondary public key, and a plurality of partitions. For example, such a boot image partitions file may be of the form:

bootimage_partitions:
{
[ppkfile] ppk.pk1
[spkfile] spk.pk1
[spksignature] spk.pk1.sha.256.sig

[boot loader, encryption=aes, authentication=rsa] fsbl.elf
[encryption=aes, authentication=rsa] system.bit
[authentication=rsa] u-boot.elf
}

In this example, for two partitions, Advanced Encryption Standard ("AES") encryption is used, namely for a first stage boot loader and a system configuration; however, this or another form of encryption may be used in other examples. Authentication in this example is by RSA for each of the three partitions; however, this or another form of private-public key pair authentication may be used in other examples. At 604, partition hashes generated by Bootgen 210 are of respective partitions. For this example, such hashed partitions generated by Bootgen 210 are fsbl.elf.0.sha256, u-boot.elf.0.sha256, u-boot.elf.1.sha256, and system.bit.0.sha256. Since some ELF files consists of two partitions, namely separate program text and memory manager unit ("MMU") blocks, there may be two files, such as for this example two SHA256 files, for some partitions, such as a U-boot partition in this example. The 0 or 1 in such files indicates a linkage. However, for purposes of clarity and not limitation, it shall be assumed that only one SHA256 file is generated for each partition.

A boot image is not yet completely processed after partition hashes are generated at 604, as at 605 such hashes generated at 604 are signed at 605, namely signatures are generated for the hashes generated at 604. Along those lines, hashes generated at 604 may be input to signature tool 320 to generate signatures respectively therefor. A secret key, such as for example ssk.pk1, may be used by signature tool 320 to generate such signatures. Continuing the above example, for each of set of data or data file, namely fsbl.elf.0.sha256, u-boot.elf.0.sha256, and system.bit.0.sha256, signature tool 320 may use a secret key, such as ssk.pk1, to respectively generate partition signatures, namely fsbl.elf.0.sha256.sig, u-boot.elf.0.sha256.sig, and system.bit.0.sha256.sig.

Operations from 601 through to 605 may be used to complete an emulation process, as described above, to provide a boot image file 606 having signed partitions. Such boot image file 606 may be loaded into a system having a PLD at 607 to create an image, namely configure and/or program such system responsive to such boot image file 606 for securely booting such system. Continuing the above example, such pre-signed boot image BIF file 606 may appear as follows:
bootimage_presign:
{
[ppkfile] ppk.pk1
[spkfile] spk.pk1
[spksignature] spk.pk1.sha256.sig
[boot loader, encryption=aes, authentication=rsa, presign=fsbl.elf.0.sha256.sig]
fsbl.elf
[encryption=aes, authentication=rsa, presign=system.bit.0.sha256.sig] system.bit
[encryption=aes,authentication=rsa, presign=u-boot.elf.0.sha256.sig] u-boot.elf
}

Furthermore, there may be Linux partitions, for a random access memory disk, a device tree, and/or other Linux partitions. These partitions may likewise be hashed and signed. Accordingly, for example, another example of such pre-signed boot image BIF file 606 may appear as follows:
bootimage_presign:
{
[ppkfile] ppk.pk1
[spkfile] spk.pk1
[spksignature] spk.pk1.sha256.sig
[boot loader, encryption=aes, authentication=rsa, presign=fsbl.elf.0.sha256.sig]
fsbl.elf
[encryption=aes, authentication=rsa, presign=system.bit.0.sha256.sig]
system.bit
[encryption=aes,authentication=rsa, presign=u-boot.elf.0.sha256.sig] u-boot.elf
[authentication=rsa, presign=uImage.bin.sha256.sig] uImage.bin
[authentication=rsa, presign=devicetree.dtb.sha256.sig] devicetree.dtb
[authentication=rsa, presign=uramdisk.image.gz.sha256.sig] uramdisk.image.gz
[encryption=aes, authentication=rsa, presign=sobel_cmd.0.elf.sha256.sig]
sobel_cmd.elf
}

These are just two of many possible configurations of a pre-signed boot image BIF file 606.

Figure 7:
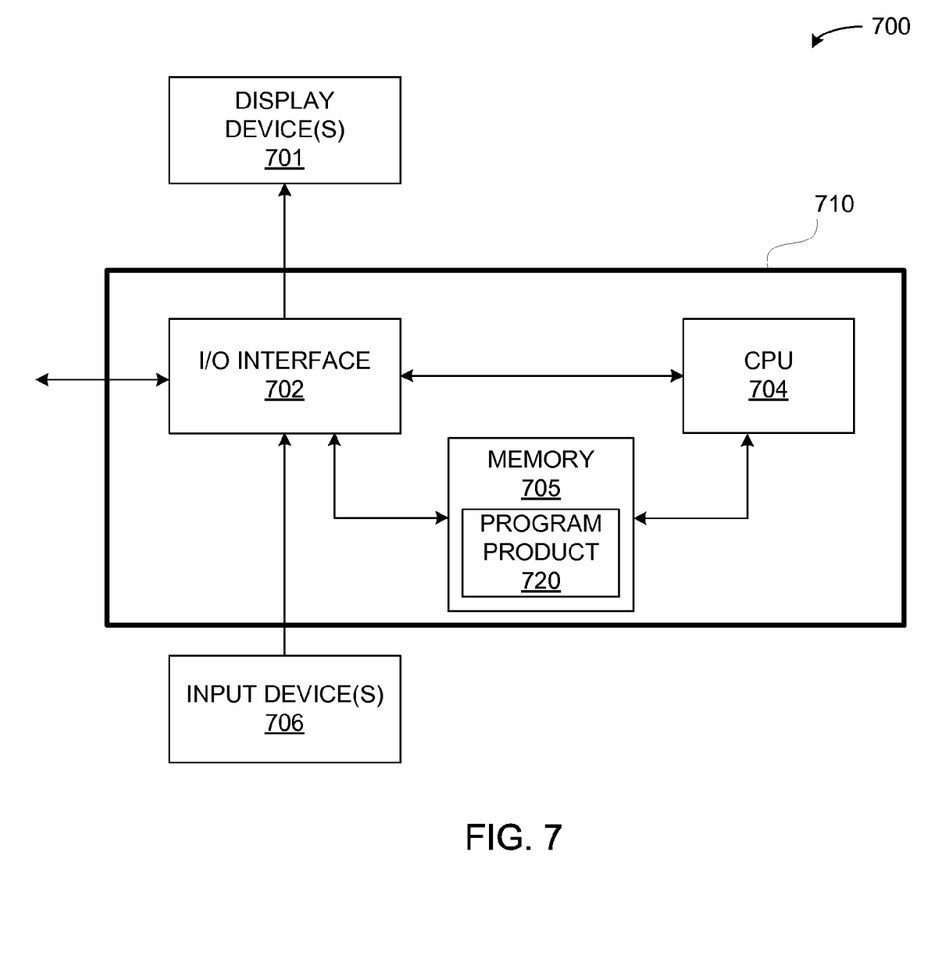
FIG. 7 is a block diagram depicting an exemplary computer system or other information handling system.

FIG. 7 is a block diagram depicting an exemplary computer system or other information handling system 700. Computer system 700 may include a programmed computer 710 coupled to one or more display devices 701, such as Cathode Ray Tube ("CRT") displays, plasma displays, Liquid Crystal Displays ("LCD"), projectors and to one or more input devices 706, such as a keyboard and a cursor pointing device. Other known configurations of a computer system may be used. Computer system 700 by itself or networked with one or more other computer systems 700 may provide an information handling system.

Programmed computer 710 may be programmed with a known operating system, which may be Mac OS, Java Virtual Machine, Real-Time OS Linux or ARM, Solaris, iOS, Android Linux-based OS, Unix, or a Windows operating system, among other known platforms. Programmed computer 710 includes a central processing unit (CPU) 704, memory 705, and an input/output ("I/O") interface 702. CPU 704 may be a type of microprocessor known in the art, such as available from IBM, Intel, ARM, and Advanced Micro Devices for example. Support circuits (not shown) may include cache, power supplies, clock circuits, data registers, and the like. Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below.

I/O interface 702 may include chip set chips, graphics processors, and/or daughter cards, among other known circuits. An example of a daughter card may include a network interface card ("NIC"), a display interface card, a modem card, and a Universal Serial Bus ("USB") interface card, among other known circuits. Thus, I/O interface 702 may be coupled to a conventional keyboard, network, mouse, display printer, and interface circuitry adapted to receive and transmit data, such as data files and the like. Programmed computer 710 may be coupled to a number of client computers, server computers, or any combination thereof via a conventional network infrastructure, such as a company's Intranet and/or the Internet, for example, allowing distributed use for interface generation.

Memory 705 may store all or portions of one or more programs or data to implement processes in accordance with one or more embodiments hereof to provide program product 720. Additionally, those skilled in the art will appreciate that one or more embodiments hereof may be implemented in hardware, software, or a combination of hardware and software. Such implementations may include a number of processors or processor cores independently executing various programs and dedicated hardware or programmable hardware.

One or more program(s) of program product 720, as well as documents thereof, may define functions of embodiments hereof and can be contained on a variety of non-transitory signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD). The above embodiments specifically include information downloaded from the Internet and other networks. Such non-transitory signal-bearing media, when carrying computer-readable instructions that direct functions hereof, represent embodiments hereof.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus, comprising:
   an image generator coupled to receive partitions and a public key and configured to generate respective hashes of the partitions and a hash of the public key;
   a signature generator in communication with the image generator to generate respective signatures for the hashes of the partitions in association with the public key and a signature of the hash of the public key;
   wherein the image generator and the signature generator are programmed into a general-purpose computer to provide a special-purpose computer;
   wherein the special-purpose computer is configured to output an image file for an embedded device; and
   wherein the image file includes the public key, the signatures of the hashes of the partitions, and the signature of the hash of the public key.

2. The apparatus according to claim 1, wherein the image file includes a plurality of public keys including the public key.

3. The apparatus according to claim 2, wherein:
   the plurality of public keys include a primary public key and a secondary public key; and
   the signature of the hash of the public key is for the secondary public key.

4. The apparatus according to claim 2, wherein the partitions include a hardware boot loader partition, a configuration bitstream partition, and a software boot loader partition.

5. A method performed by an information handling system for generating a boot image for an embedded device, the method comprising:
   obtaining a public key by a boot image generator;
   generating a first hash for the public key by the boot image generator;
   providing the first hash to a signature generator;
   generating a first signature for the first hash by the signature generator;
   obtaining a first partition for the boot image by the boot image generator;
   generating a second hash for the first partition by the boot image generator;
   providing the second hash to the signature generator;
   generating a second signature for the second hash by the signature generator;
   wherein the boot image generator and the signature generator are programmed into the information handling system;
   wherein the boot image includes the public key, the first signature, and the second signature; and
   outputting the boot image from the information handling system.

6. The method according to claim 5, further comprising:
   obtaining a second partition for the boot image by the boot image generator;
   generating a third hash for the second partition by the boot image generator;
   providing the third hash to the signature generator;
   generating a third signature for the third hash by the signature generator;
   wherein the boot image further includes the third signature; and
   wherein the outputting of the boot image includes the third signature.

7. The method according to claim 6, wherein:
   the first partition is for a hardware boot loader; and
   the second partition is for a software boot loader.

8. The method according to claim 6, wherein:
   the first partition is for a hardware boot loader; and
   the second partition is for a configuration bitstream for the embedded device.

9. The method according to claim 8, wherein the embedded device includes a programmable logic device.

10. The method according to claim 6, further comprising:
    providing a computer program product for generation of the boot image, the computer program product comprising:
       a non-transitory computer-readable storage medium; and
       a computer-readable program stored on the computer-readable storage medium;
    wherein the computer-readable program is capable of being processed by the information handling system for causing the information handling system to perform the obtaining of the public key, the generating of the first hash, the providing of the first hash, the generating of the first signature, the obtaining of the first partition, the generating of the second hash, the providing of the second hash, the generating of the second signature, the obtaining of the second partition, the generating of the third hash, the providing of the third hash, the generating of the third signature, and the outputting of the boot image.

11. The method according to claim 5, further comprising:
    obtaining a second partition for the boot image by the boot image generator;
    generating a third hash for the second partition by the boot image generator;
    providing the third hash to the signature generator;
    generating a third signature for the third hash by the signature generator;

obtaining a third partition for the boot image by the boot image generator;

generating a fourth hash for the third partition by the boot image generator;

providing the fourth hash to the signature generator;

generating a fourth signature for the fourth hash by the signature generator;

wherein the boot image further includes the third signature and the fourth signature; and wherein the outputting of the boot image includes the third signature and the fourth signature.

12. The method according to claim 11, wherein:

the first partition is for a hardware boot loader;

the second partition is for a configuration bitstream for the embedded device; and the third partition is for a software boot loader.

13. The method according to claim 12, wherein the embedded device includes a programmable logic device.

14. The method according to claim 11, further comprising:

providing a computer program product for generation of the boot image, the computer program product comprising:

a non-transitory computer-readable storage medium; and a computer-readable program stored on the computer-readable storage medium;

wherein the computer-readable program is capable of being processed by the information handling system for causing the information handling system to perform the obtaining of the public key, the generating of the first hash, the providing of the first hash, the generating of the first signature, the obtaining of the first partition, the generating of the second hash, the providing of the second hash, the generating of the second signature, the obtaining of the second partition, the generating of the third hash, the providing of the third hash, the generating of the third signature, the obtaining of the third partition, the generating of the fourth hash, the providing of the fourth hash, the generating of the fourth signature, and the outputting of the boot image.

15. A method performed by an information handling system for generation of a boot image for an embedded device, the method comprising:

generating a key hash by an image writer for each of a plurality of public key sets to provide a plurality of key hashes;

generating a key signature by a signature tool for each of the plurality of key hashes to provide a plurality of key signatures;

generating a partition hash by the image writer for each of a plurality of partitions to provide a plurality of partition hashes;

generating a partition signature by the signature tool for each of the plurality of partition hashes to provide a plurality of partition signatures;

wherein the information handling system is programmed with the image writer and the signature tool; and outputting the boot image from the information handling system;

wherein the boot image includes the plurality of partition signatures.

16. The method according to claim 15, further comprising generating the plurality of public key sets in association with at least one secret key.

17. The method according to claim 15, further comprising:

loading the boot image into the embedded device; and booting the embedded device with the boot image;

wherein the booting includes authenticating the plurality of partition signatures using the plurality of key signatures.

18. The method according to claim 15, wherein the boot image further includes the plurality of key signatures.

19. The method according to claim 18, wherein the boot image further includes the plurality of public key sets.

20. The method according to claim 15, further comprising:

providing a computer program product for generation of the boot image, the computer program product comprising:

a non-transitory computer-readable storage medium; and a computer-readable program stored on the computer-readable storage medium;

wherein the computer-readable program is capable of being processed by the information handling system for causing the information handling system to perform the generating of the key hash, the generating of the key signature, the generating of the partition hash, the generating of the partition signature, and the outputting of the boot image.

* * * * *